United States Patent [19]

Terasawa et al.

[11] 4,449,791
[45] May 22, 1984

[54] THREE-GROUP ZOOM LENS

[75] Inventors: Hidenori Terasawa, Kawasaki; Kiyoshi Hayashi, Yokohama, both of Japan

[73] Assignee: Nippon Kogaku K.K., Tokyo, Japan

[21] Appl. No.: 292,436

[22] Filed: Aug. 14, 1981

[30] Foreign Application Priority Data

Aug. 22, 1980 [JP] Japan .................. 55-115373

[51] Int. Cl.³ .................................. G02B 15/16
[52] U.S. Cl. ........................................... 350/427
[58] Field of Search ........................... 350/423, 427

[56] References Cited

U.S. PATENT DOCUMENTS 4,240,700 12/1980 Ogawa et al. ................ 350/427
4,380,376 4/1983 Suda et al. .................... 350/427

FOREIGN PATENT DOCUMENTS 2828215 2/1979 Fed. Rep. of Germany ...... 350/427
1434747 2/1966 France ........................... 350/427

*Primary Examiner*—John K. Corbin
*Assistant Examiner*—Scott J. Sugarman
*Attorney, Agent, or Firm*—Shapiro and Shapiro

[57] ABSTRACT

In a three-group zoom lens having, in succession from a remoter imaging conjugate plane side, a convergent first group, a divergent second group and a convergent third group, the second group has, in succession from the first group side, a first component including at least one negative meniscus lens having its convex surface facing the first group, a second component which is a positive meniscus lens having its concave surface facing the first group, a third component which is a negative lens, and a fourth component which is a positive lens.

10 Claims, 29 Drawing Figures

THREE-GROUP ZOOM LENS

BACKGROUND OF THE INVENTION

1. Field of the Invention

This invention relates to improvements in a zoom lens for ordinary photography having a zoom ratio of 2 or greater including a standard angle of view (about 46°) and a zoom lens for finite distance having a zoom ratio of 2 or greater.

2. Description of the Prior Art

Describing first the lens for ordinary photography, it has been usual to use a zoom type comprising two concave and convex groups in designing a zoom lens capable of magnification change from a wide angle range to a telephoto range. This two-group type is suitable for providing a wide angle of view, if it attempts to cover the telephoto range, considerable difficulties are encountered in terms of abberrations and correction of spherical aberration becomes impossible and the fluctuation of distortion by zooming becomes great and thus, it has only been possible to realize a zoom ratio of 2 at best in order to obtain a compact zoom lens of high performance. Also, even if use is made of a positive-negative-positive three-group type capable of withstanding the need for a certain degree of wide angle of view and securing a relatively great zoom ratio, the focal length of the divergent group must become short in order to realize a compact lens system and this is unavoidably undesirable in terms of aberrations. Particularly, as regards distortion, essentially negative distortion occurs in the second group and in addition, along with zooming, the variation in position of light rays passing through the divergent group which is the second group becomes so great that there occurs a fluctuation of distortion, and it has been difficult to correct it.

On the other hand, aside from the field of photographing chiefly objects at infinity, there are fields such as micro photography in which photography is effected at a predetermined finit distance, macro photography, photograph enlargement, plate making, etc., and devices using zoom lenses in the cameras, readers, printers, etc. for these fields are also being announced. However, in these zoom lenses, the imaging performance required is very high and therefore, it is difficult to maintain a performance not inferior to that of fixed focus lenses over the entire magnification range and particularly, correction of distortion has been difficult. In zoom lenses for finit distance, imaging performance is important, but the disadvantage that the amount of movement of each group from the maximum magnification to the minimum magnification becomes too great must be overcome, and such disadvantage becomes greater as the magnification range approaches one-to-one magnification. In this respect again, two-group zoom lenses are not suitable. The above-mentioned three-group zoom lenses can obtain a great zome ratio by a relatively small amount of movement of each group, bit if it is attempted to increase the zoom ratio, the diameter of any of the groups becomes too great, and not only it has been difficult to secure a sufficient back focal length, but also it has been difficult to well correct distortion over a wide range of magnification variation.

SUMMARY OF THE INVENTION

It is an object of the present invention to provide a zoom lens which comprises three groups, namely, a first convergent group, a divergent group and a second convergent group and which, irrespective of for ordinary photography or for finite distance, has a wide magnification change range of a zoom ratio of 2 or greater and a sufficient back focal length and yet in which various abberrations, particularly distortion, has been well corrected over the entire magnification change range.

The invention will become fully apparent from the following detailed description thereof taken in conjunction with the accompanying drawings.

DESCRIPTION OF THE PREFERRED EMBODIMENTS

Figure 1A:
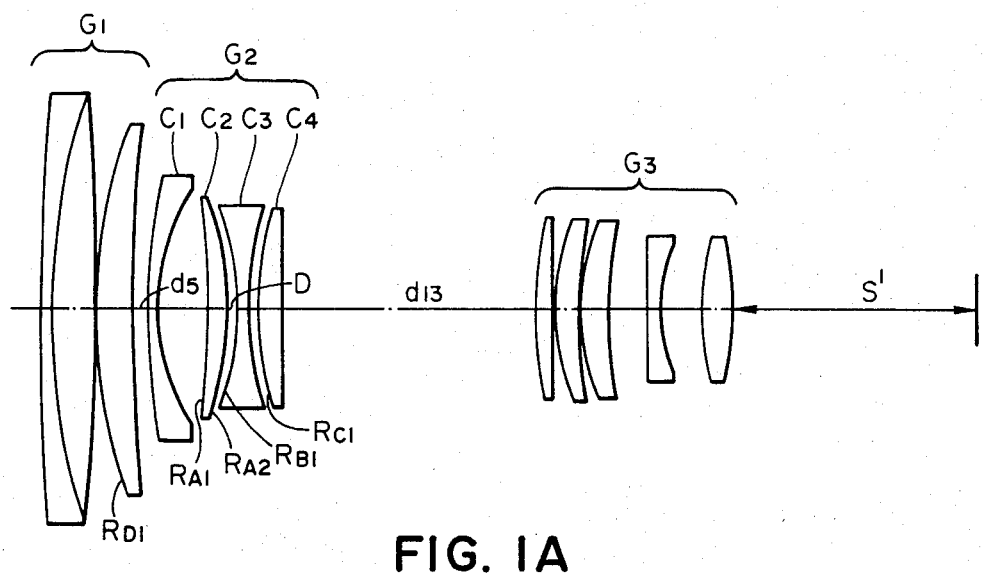
FIGS. 1A and 1B illustrate the lens construction according to a first embodiment of the present invention and the manner of movement of each group for magnification change.

The zoom lens according to the present invention comprises, in succession from the remoter imaging conjugate plane side, a convergent first group $G_1$, a divergent second group $G_2$ and a convergent third group $G_3$, the focal length of the entire system being varied and at the same time the image plane being maintained constant by moving at least the second group $G_2$ and the third group $G_3$ relative to each other, the second group $G_2$ having, in succession from the first group side, a first component $C_1$ including at least one negative meniscus lens having its convex surface facing the first group $G_1$, a second component $C_2$ comprising a positive meniscus lens having its concave surface facing the first group, a third component $C_3$ comprising a negative lens, and a fourth component $C_4$ comprising a positive lens, and satisfies the following conditions:

$$|1.5 f_{II}| < f_A < |4.0 f_{II}| \tag{1}$$

$$-5.0 < \frac{R_{A2} + R_{A1}}{R_{A2} - R_{A1}} < -1.5 \tag{2}$$

where $f_{II}$: combined focal length of the second group $G_2$ $f_A$: focal length of the positive meniscus lens which is the second component in the second group $G_2$ $R_{A1}$: radius of curvature of the surface of the second component $C_2$ in the second group $G_2$ which is adjacent to the first group.

$R_{A2}$: radius of curvature of the surface of the second component $C_2$ in the second group $G_2$ which is adjacent to the third group In the construction of the second group $G_2$ according to the present invention, condition (1) prescribes the distribution of refractive power for the positive meniscus lens which is the second component $C_2$ in the second group $G_2$, and condition (2) prescribes the meniscus shape of this second component $C_2$. By satisfying these two conditions, the contribution to the positive distortion of the second group $G_2$ is increased and good correction of distortion becomes possible over the entire magnification change range while, at the same time, astigmatism and coma can be well corrected. If the upper limit of condition (1) is exceeded, the function of the second component $C_2$ as a positive lens will become weaker and the contribution to positive distortion will become correspondingly less and thus, it will become difficult to correct distortion over the entier magnification change range. If the lower limit of condition (1) is exceeded, the contribution to positive distortion will become too great and further, occurrence of the asymmetric component of coma will result on the short focal length side, and this is not preferable. Condition (2) is for well correcting distortion as well as curvature of image field and astigmatism and, if the range of this condition is exceeded, curvature of image field and astigmatism will be increased. Further, fluctuation of these aberrations by the angle of view will also occur on the long focal length side and the asymmetry of coma will become remarkable.

Also, the negative meniscus lens which is the first component $C_1$ in the second group, if constituted by two lenses, will lead to the possibility of allotting a stronger negative refractive power to the respective two lenses than if constituted by one lens and will mitigate the occurrence of negative distortion, and this is more desirable for the purpose of the present invention.

It is desirable that the above-described construction of the present invention further satisfy the following conditions:

$$0.85 < R_{A2}/R_{B1} < 1.25 \quad (3)$$

$$0.02 < D/R_{A2} < 0.15 \quad (4)$$

$$|0.5 f_{II}| < |R_{C1}| < |1.3 f_{II}| \quad (5)$$

where $R_{B1}$: radius of curvature of the first group side surface of the negative lens which is the third component $C_3$ in the second group $G_2$ $D$: air space between the second component $C_2$ and the third component $C_3$ in the second group $G_2$ $R_{C1}$: radius of curvature of the first group side surface of the positive lens which is the fourth component $C_4$ in the second group $G_2$ Conditions (3) and (4) are for better correcting curvature of image field, astigmatism and coma in addition to correcting chiefly distortion by the aforementioned two conditions (1) and (2). If the lower limit of condition (3) is exceeded, curvature of image field will become under-corrected and, if the upper limit of condition (3) is exceeded, curvature of image field will become over-corrected. Also, outside of the range of condition (3), astigmatism will be increased and fluctuation of the meridional image plane by the angle of view will appear and correspondingly, asymmetry of coma will appear considerably remarkably on the long focal length side and bending of coma will also become remarkable. Also, fluctuations of curvature of image field and astigmatism on the short focal length side and the long focal length side will become great.

Condition (4) regarding the air space D between the second component $C_2$ and the third component $C_3$ in the second group $G_2$ supplements condition (3) and is also concerned with correction of curvature of image field and astigmatism. If the lower limit of condition (4) is exceeded, curvature of image field will become excessive in the positive direction and astigmatism will also be increased. On the other hand, if the upper limit of condition (4) is exceeded, curvature of image field will become excessive in the negative direction and astigmatism will also be increased. Outside of the range of condition (4), both curvature of image field and astigmatism will remarkably fluctuate on the short focal length side and the long focal length side. In the air space between the surface $R_{A2}$ of the second component $C_2$ which is adjacent to the third group and the surface $R_{B1}$ of the third component which is adjacent to the first group, oblique rays are remarkably refracted and therefore, in order to effect good abberration correction, mutual negation must be effected in the area of high order aberration, and conditions (3) and (4) are desirable also for keeping a subtle balance of high order aberration.

Condition (5) is concerned chiefly with spherical aberration. If the lower limit of this condition is exceeded, spherical aberration on the long focal length side will occur greatly in the negative direction and good correction will become difficult and in addition, asymmetric coma will occcur. If the upper limit of condition (5) is exceeded, spherical aberration on the long focal length side will become greatly under-corrected and at the same time, asymmetric coma will also occur.

It should be noted that the first group may comprise at least two positive lens components and one of them, preferably, the forward positive lens component, may be a cemented lens comprising two or three lenses for achromatization or the cemented lens may be separated into a positive lens and a negative lens arranged with a slight air space interposed therebetween. It is desirable that the first group satisfy the following condition:

$$0.3 f_I < R_{D1} < 0.8 f_I \quad (6)$$

where $R_{D1}$: radius of curvature of the first surface of the positive lens in the first group $G_1$ which is most adjacent to the second group $f_I$: combined focal length of the first group $G_1$.

If the lower limit of this condition (6) is exceeded, fluctuation of distortion on the short focal length side and the long focal length side will become great and asymmetry of coma will appear. If the upper limit of this condition is exceeded, curvature of image field on the long focal length side will become great and coma, particularly inner coma, will become great in the positive direction and it will thus become difficult to maintain symmetry.

As regards the third group $G_3$, the type thereof would become different depending on the aperture ratio of the lens system, but it is desirable that this group basically comprise, in succession from the second group, three components, i.e., a positive first component, a negative second component and a positive third component. The positive first component may comprise two or three positive lenses, one of which may be a cemented lens for achromatization. The negative second component may comprise a single negative lens, which may also be a cemented lens for achromatization. The positive third component may comprise one or two positive lenses, one of which may be a cemented achromatic lens for correction of chromatic difference of magnification.

Description will now be made of five embodiments of the three-group zoom lens according to the present invention.

Figure 1B:
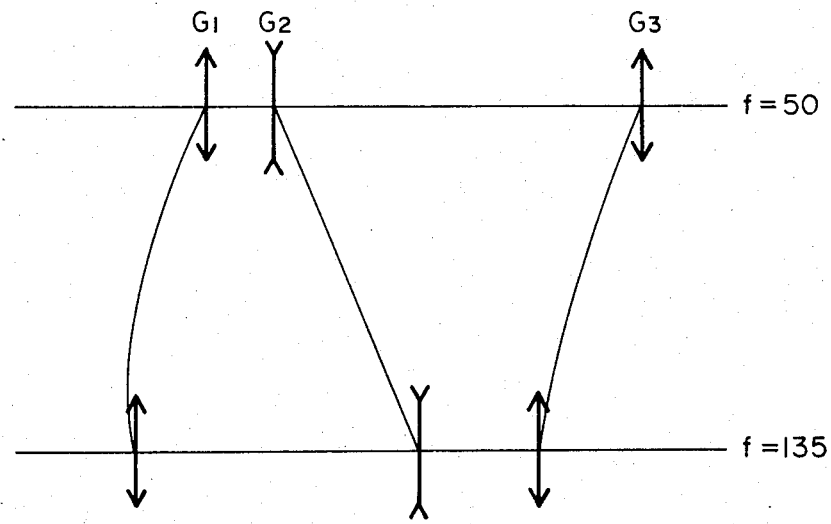

A first embodiment of the present invention is a zoom lens for ordinary photography having a focal length $f=50-135$, a zoom ratio 27 and F-number 4,5. The lens construction of this embodiment is as shown in FIG. 1A, and the manner of movement of each group for magnification change is shown in FIG. 1B. As shown, in the present embodiment, the three groups effect different movements. The first component $C_1$ of the second group $G_2$ comprises a single negative meniscus lens.

Second to fifth embodiments of the present invention are zoom lenses for finite distance. In these four embodiments, an object is disposed on the near imaging conjugate plane, whereby magnified photography of about two to about thirty times can be accomplished, and conversely, if an object is disposed on the remoter imaging conjugate plane, reduced photography of about 1/30 to about ½ times can be accomplished. Each embodiment is designed such that in the case of reduced photography, the effective F-number Fe varies with the change in photographing magnification but that in the case of magnified photography, the effective F-number is maintained constant irrespective of any change in magnification. The ensuing description and numerical data tables refer to the case of reduced photography in which the remoter imaging conjugate plane is the object plane.

Figure 2A:
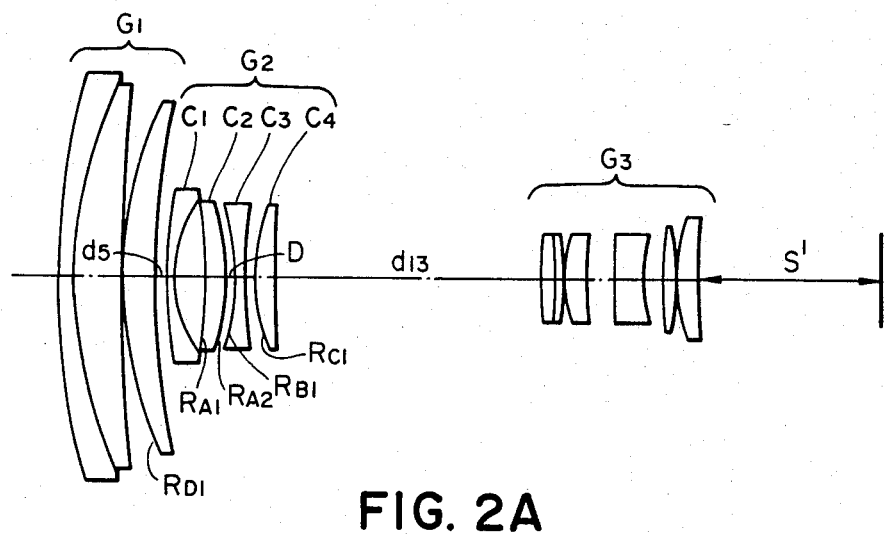
FIGS. 2A and 2B are views similar to FIGS. 1A and 1B but concerning a second embodiment of the present invention.
Figure 2B:
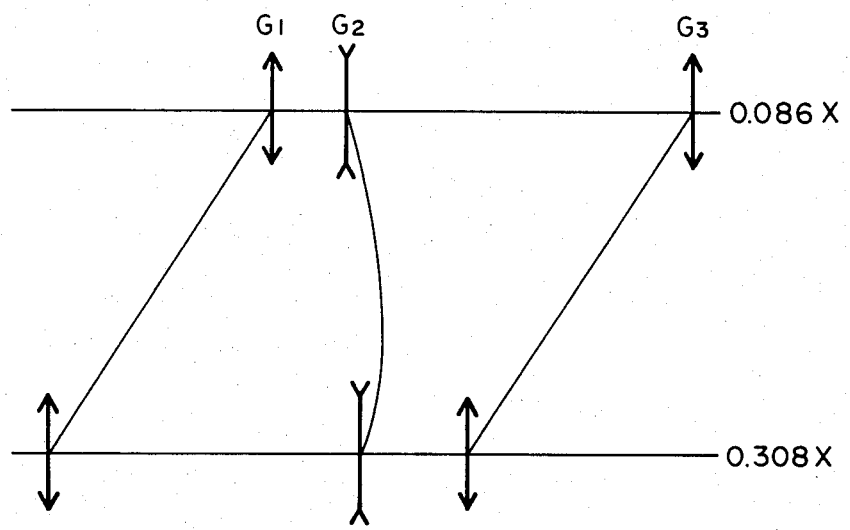

The second embodiment shown in FIG. 2A has a magnification of $0.086\times -0.308\times$, A focal length $f=32-92$ mm and Fe=5.9-20.1 and, as shown in FIG. 2B, the first group $G_1$ and the third group $G_3$ are connected together to effect the same movement. Again in this embodiment, the first component $C_1$ of the second group $G_2$ comprises a single negative meniscus lens.

Figure 3A:
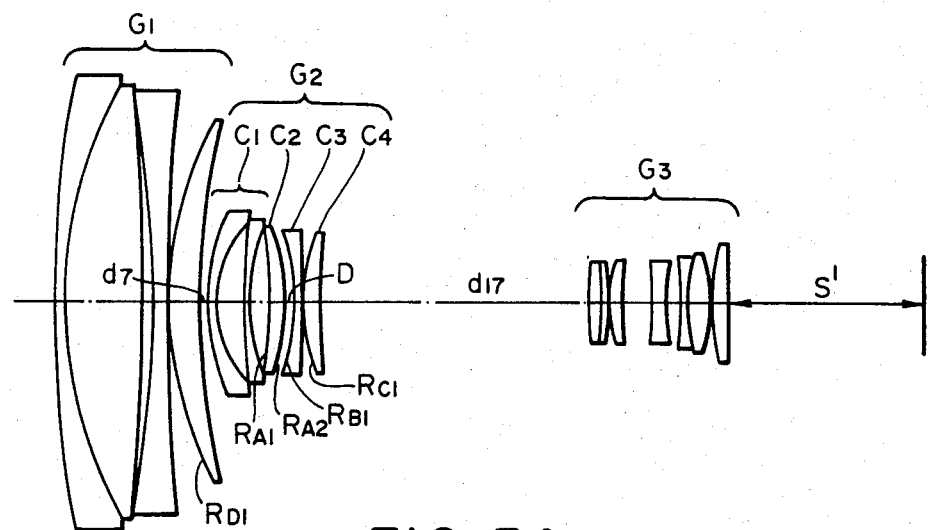
FIGS. 3A and 3B are views similar to FIGS. 1A and 1B but concerning a third embodiment of the present invention.
Figure 3B:
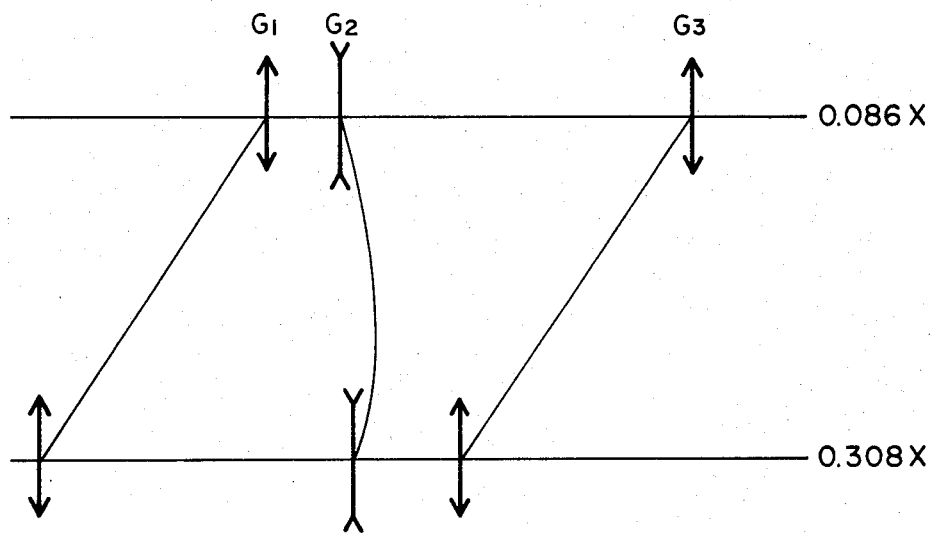

The third embodiment shown in FIG. 3A has a magnification of $0.086\times -0.308\times$, a focal length $f=32-94$ mm and Fe=5.9-21, and as shown in FIG. 3B, the first group $G_1$ and the third group $G_3$ are connected together to effect the same movement. The first component $C_1$ of the second group $G_2$ comprises two meniscus lenses.

Figure 4A:
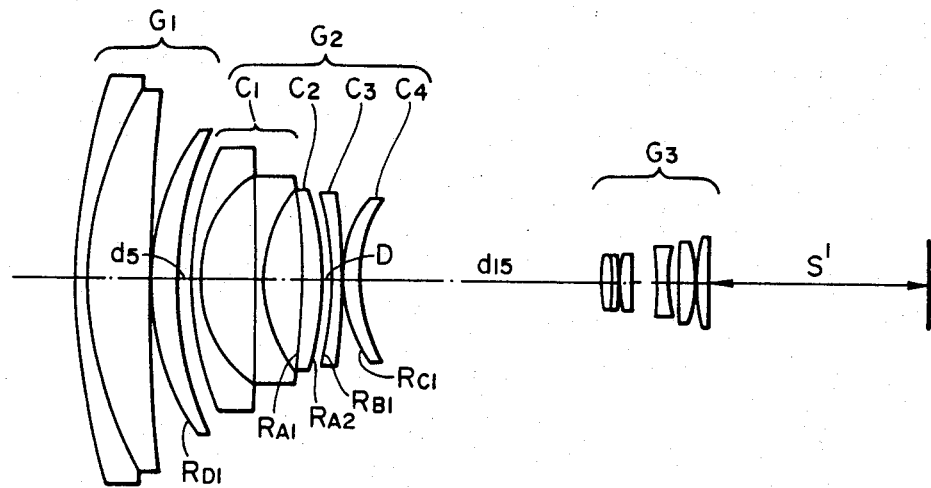
FIGS. 4A and 4B are views similar to FIGS. 1A and 1B but concerning a fourth embodiment of the present invention.
Figure 4B:
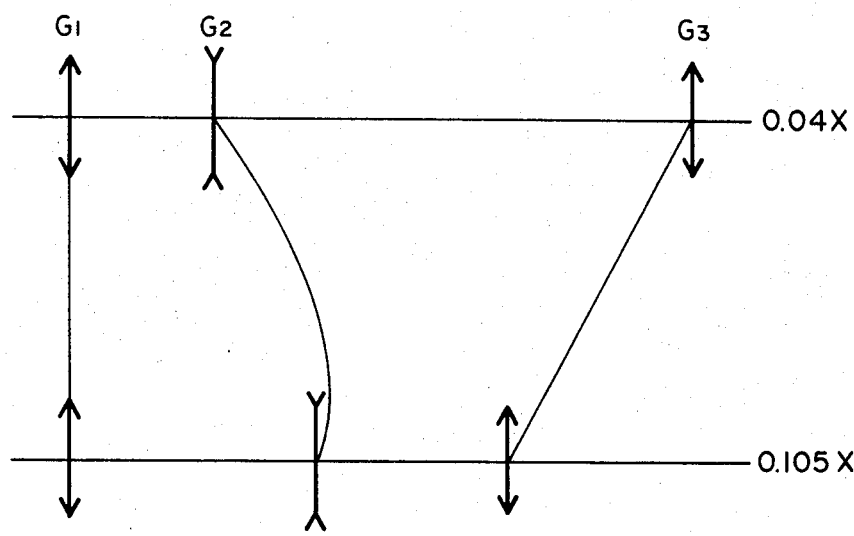

The fourth embodiment shown in FIG. 4A has a magnification of $0.04\times -0.105\times$, a focal length $f=32-80$ mm and Fe=8.3-11.3. For magnification change, as shown in FIG. 4B, only the second and third groups $G_2$ and $G_3$ are moved and the first group $G_1$ remains fixed. Again in this embodiment, the first component $C_1$ of the second group $G_2$ comprises two negative meniscus lenses.

Figure 5A:
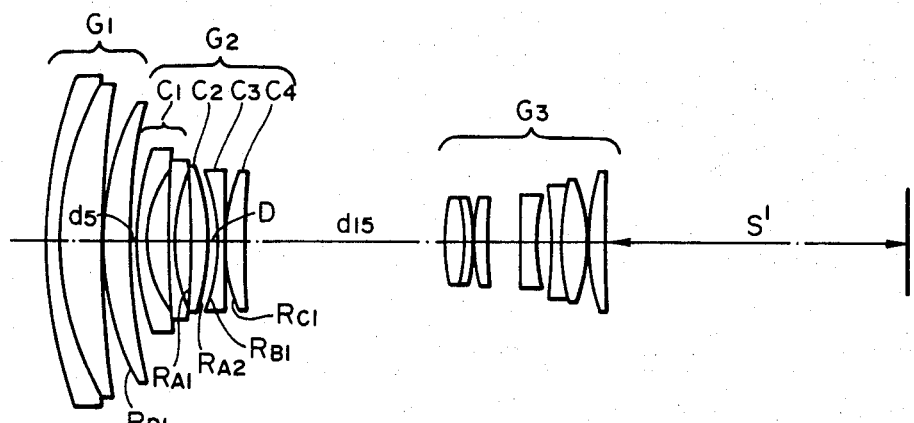
FIGS. 5A and 5B are views similar to FIGS. 1A and 1B but concerning a fifth embodiment of the present invention.
Figure 5B:
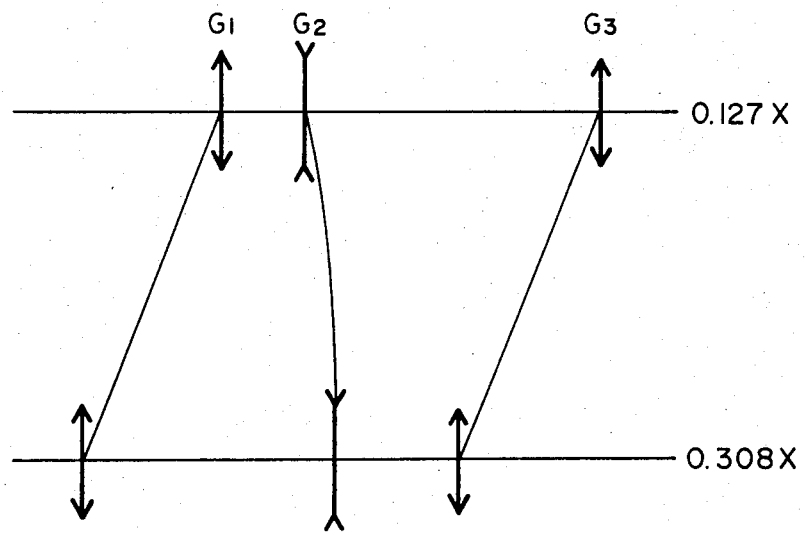

The fifth embodiment shown in FIG. 5A has a magnification of $0.127\times -0.308\times$, a focal length $f=45-91$ mm and Fe=6.3-15.4, and for magnification change, as shown in FIG. 5B, the first group $G_1$ and the third group $G_3$ are connected together to effect the same movement. Again in this embodiment, the first component $C_1$ of the second group $G_2$ comprises two negative meniscus lenses.

The numerical data of each embodiment of the present invention will be shown below. In the tables below, $r_1, r_2, r_3, \ldots$, represent the radii of curvature of the refracting surfaces of the successive lenses from the object side, $d_1, d_2, d_3, \ldots$, represent the center thicknesses and air spaces of the respective lenses, $Nd_1, Nd_2, Nd_3, \ldots$, represent the refractive indices of the respective lenses for d-line ($\lambda=587.6$ nm), and $\nu d_1, \nu d_2, \nu d_3, \ldots$, represent the Abbe numbers of the respective lenses.

First Embodiment $f = 50$ mm ~ 135 mm   Aperture ratio 1:4.5

| | | | |
|---|---|---|---|
| $r_1 = 533.59$ | $d_1 = 1.5$ | $Nd_1 = 1.8052$ | $\nu d_1 = 25.4$ |
| $r_2 = 84.07$ | $d_2 = 6.0$ | $Nd_2 = 1.6700$ | $\nu d_2 = 47.1$ |
| $r_3 = -377.89$ | $d_3 = 0.1$ | | |
| $r_4 = 64.57$ | $d_4 = 5.0$ | $Nd_3 = 1.1$ | $\nu d_3 = 48.1$ |
| $r_5 = 196.59$ | $d_5 = $ variable | | |
| $r_6 = 119.01$ | $d_6 = 1.1$ | $Nd_4 = 1.744$ | $\nu d_4 = 45.1$ C$_1$ |
| $r_7 = 26.94$ | $d_7 = 7.15$ | | |
| $r_8 = -108.42$ | $d_8 = 3.1$ | $Nd_5 = 1.7234$ | $\nu d_5 = 38.0$ C$_2$ |
| $r_9 = -35.11$ | $d_9 = 1.5$ | | |
| $r_{10} = -29.88$ | $d_{10} = 1.15$ | $Nd_6 = 1.713$ | $\nu d_6 = 54.0$ C$_3$ |
| $r_{11} = 50.31$ | $d_{11} = 1.35$ | | |
| $r_{12} = 42.32$ | $d_{12} = 3.0$ | $Nd_7 = 1.795$ | $\nu d_7 = 28.6$ C$_4$ |
| $r_{13} = 498.92$ | $d_{13} = $ variable | | |
| $r_{14} = 59.35$ | $d_{14} = 2.3$ | $Nd_8 = 1.5891$ | $\nu d_8 = 61.2$ |
| $r_{15} = -2202.0$ | $d_{15} = 0.2$ | | |
| $r_{16} = 29.18$ | $d_{16} = 3.45$ | $Nd_9 = 1.5112$ | $\nu d_9 = 50.9$ |
| $r_{17} = 24.17$ | $d_{17} = 0.2$ | | |
| $r_{18} = 24.17$ | $d_{18} = 3.8$ | $Nd_{10} = 1.5168$ | $\nu d_{10} = 64.1$ |
| $r_{19} = 39.33$ | $d_{19} = 5.4$ | | |
| $r_{20} = 173.54$ | $d_{20} = 1.85$ | $Nd_{11} = 1.8052$ | $\nu d_{11} = 25.4$ |
| $r_{21} = 19.91$ | $d_{21} = 6.0$ | | |
| $r_{22} = 44.01$ | $d_{22} = 4.1$ | $Nd_{12} = 1.6127$ | $\nu d_{12} = 44.4$ |
| $r_{23} = -62.20$ | S' | | |

Groups: $G_1$ (rows $r_1$–$r_5$), $G_2$ (rows $r_6$–$r_{13}$), $G_3$ (rows $r_{14}$–$r_{23}$)

$f_A = 70.52$     $f_I = 108.0$
$f_{II} = -35.5$    $f_{III} = 48.5$

S': Back focal length

| Focal length | $d_5$ | $d_{13}$ | S' |
|---|---|---|---|
| 50.0 | 2.495 | 35.69 | 66.409 |
| 95.46 | 24.064 | 13.347 | 76.818 |
| 135.0 | 33.615 | 0.535 | 81.427 |

Second Embodiment $f = 32$ mm $\sim 92$ mm  Effective aperture ratio Fe $1:5.9 \sim 1:20.1$
Magnification $0.086 \sim 0.308$

| | | | |
|---|---|---|---|
| $r_1 = 98.265$ | $d_1 = 2.0$ | $nd_1 = 1.80518$ | $vd_1 = 25.4$ |
| $r_2 = 56.371$ | $d_2 = 7.0$ | $nd_2 = 1.67025$ | $vd_2 = 57.6$ |
| $r_3 = 294.111$ | $d_3 = 0.1$ | | |
| $r_4 = 50.950$ | $d_4 = 4.3$ | $nd_3 = 1.713$ | $vd_3 = 54.0$ |
| $r_5 = 86.420$ | $d_5 =$ variable | | |
| $r_6 = 51.013$ | $d_6 = 1.0$ | $nd_4 = 1.744$ | $vd_4 = 45.1$ $C_1$ |
| $r_7 = 16.136$ | $d_7 = 4.6$ | | |
| $r_8 = -64.087$ | $d_8 = 2.75$ | $nd_5 = 1.71736$ | $vd_5 = 29.5$ $C_2$ |
| $r_9 = -32.942$ | $d_9 = 1.4$ | | |
| $r_{10} = -31.525$ | $d_{10} = 1.0$ | $nd_6 = 1.6223$ | $vd_6 = 53.1$ $C_3$ |
| $r_{11} = 56.459$ | $d_{11} = 1.2$ | | |
| $r_{12} = 28.476$ | $d_{12} = 3.2$ | $nd_7 = 1.71736$ | $vd_7 = 29.5$ $C_4$ |
| $r_{13} = 109.727$ | $d_{13} =$ variable | | |
| $r_{14} = 34.938$ | $d_{14} = 2.6$ | $nd_8 = 1.62041$ | $vd_8 = 60.3$ |
| $r_{15} = -38.235$ | $d_{15} = 0.9$ | $nd_9 = 1.80518$ | $vd_9 = 25.4$ |
| $r_{16} = -97.810$ | $d_{16} = 0.1$ | | |
| $r_{17} = 17.003$ | $d_{17} = 3.0$ | $nd_{10} = 1.56384$ | $vd_{10} = 60.8$ |
| $r_{18} = 37.067$ | $d_{18} = 4.0$ | | |
| $r_{19} = 294.676$ | $d_{19} = 3.8$ | $nd_{11} = 1.78797$ | $vd_{11} = 47.5$ |
| $r_{20} = 15.549$ | $d_{20} = 3.3$ | | |
| $r_{21} = 348.425$ | $d_{21} = 1.8$ | $nd_{12} = 1.49782$ | $vd_{12} = 82.3$ |
| $r_{22} = -34.381$ | $d_{22} = 0.1$ | | |
| $r_{23} = 23.524$ | $d_{23} = 2.7$ | $nd_{13} = 1.49782$ | $vd_{13} = 82.3$ |
| $r_{24} = 62.146$ | S' | | |

Groups: $r_1$–$r_5$ = $G_1$; $r_6$–$r_{13}$ = $G_2$; $r_{14}$–$r_{24}$ = $G_3$ $f_A = 91.130$  $f_I = 105.000$  $f_{II} = -31.932$
$f_{III} = 36.385$  S': Back focal length

| Magnification | $d_5$ | $d_{13}$ | S' |
|---|---|---|---|
| 0.086 | 1.716 | 36.947 | 43.015 |
| 0.118 | 12.516 | 26.147 | 48.542 |
| 0.183 | 24.516 | 14.147 | 58.399 |
| 0.308 | 35.516 | 3.147 | 75.707 |

Third Embodiment $f = 32$ mm $\sim 94$ mm  Effective aperture ratio Fe $1:5.9 \sim 1:21$
Magnification $0.086 \sim 0.308$

| | | | |
|---|---|---|---|
| $r_1 = 131.806$ | $d_1 = 2.0$ | $Nd_1 = 1.71736$ | $vd_1 = 29.5$ |
| $r_2 = 56.247$ | $d_2 = 11.0$ | $Nd_2 = 1.67025$ | $vd_2 = 57.6$ |
| $r_3 = 208.885$ | $d_3 = 1.0$ | | |
| $r_4 = -149.871$ | $d_4 = 2.0$ | $Nd_3 = 1.54814$ | $vd_3 = 45.9$ |
| $r_5 = 434.555$ | $d_5 = 0.1$ | | |
| $r_6 = 48.661$ | $d_6 = 4.0$ | $Nd_4 = 1.717$ | $vd_4 = 48.1$ |
| $r_7 = 82.614$ | $d_7 =$ variable | | |
| $r_8 = 27.655$ | $d_8 = 0.9$ | $Nd_5 = 1.55115$ | $vd_5 = 49.6$ |
| $r_9 = 14.510$ | $d_9 = 3.7$ | | |
| $r_{10} = 62.590$ | $d_{10} = 0.9$ | $Nd_6 = 1.55115$ | $vd_6 = 49.6$ |
| $r_{11} = 22.908$ | $d_{11} = 3.2$ | | |
| $r_{12} = -51.007$ | $d_{12} = 2.0$ | $Nd_7 = 1.71736$ | $vd_7 = 29.5$ |
| $r_{13} = -26.403$ | $d_{13} = 1.4$ | | |
| $r_{14} = -24.720$ | $d_{14} = 0.9$ | $Nd_8 = 1.6223$ | $vd_8 = 53.1$ |
| $r_{15} = 296.098$ | $d_{15} = 0.1$ | | |
| $r_{16} = 26.790$ | $d_{16} = 2.0$ | $Nd_9 = 1.71736$ | $vd_9 = 29.5$ |
| $r_{17} = 61.177$ | $d_{17} =$ variable | | |
| $r_{18} = 40.653$ | $d_{18} = 3.0$ | $Nd_{10} = 1.62041$ | $vd_{10} = 60.4$ |
| $r_{19} = -34.546$ | $d_{19} = 0.9$ | $Nd_{11} = 1.80518$ | $vd_{11} = 25.4$ |
| $r_{20} = -64.772$ | $d_{20} = 0.1$ | | |
| $r_{21} = 17.153$ | $d_{21} = 1.7$ | $Nd_{12} = 1.60311$ | $vd_{12} = 60.7$ |
| $r_{22} = 38.274$ | $d_{22} = 4.2$ | | |
| $r_{23} = -172.190$ | $d_{23} = 1.9$ | $Nd_{13} = 1.78797$ | $vd_{13} = 47.5$ |
| $r_{24} = 18.932$ | $d_{24} = 2.2$ | | |
| $r_{25} = -68.879$ | $d_{25} = 0.9$ | $Nd_{14} = 1.61266$ | $vd_{14} = 44.5$ |
| $r_{26} = 30.859$ | $d_{26} = 3.1$ | $Nd_{15} = 1.51823$ | $vd_{15} = 59.0$ |
| $r_{27} = -21.455$ | $d_{27} = 0.1$ | | |
| $r_{28} = 30.206$ | $d_{28} = 2.1$ | $Nd_{16} = 1.51860$ | $vd_{16} = 70.1$ |
| $r_{29} = 180.423$ | S' | | |

Groups: $r_1$–$r_7$ = $G_1$; $r_8$–$r_{17}$ = $G_2$ (with $C_1$: $r_8$–$r_{11}$, $C_2$: $r_{12}$–$r_{13}$, $C_3$: $r_{14}$–$r_{15}$, $C_4$: $r_{16}$–$r_{17}$); $r_{18}$–$r_{29}$ = $G_3$ $f_A = 73.80$
$f_I = 109.85$
$f_{II} = -31.25$
$f_{III} = 36.48$
S': Back focal length

| Magnification | $d_7$ | $d_{17}$ | S' |
|---|---|---|---|
| 0.086 | 1.548 | 37.525 | 47.654 |
| 0.118 | 12.233 | 26.840 | 53.259 |
| 0.181 | 24.216 | 14.856 | 63.520 |
| 0.308 | 35.201 | 3.872 | 82.256 |

Fourth Embodiment $f = 32$ mm~80 mm  Effective aperture ratio Fe 1:8.3~1:11.3
Magnification 0.04~0.105

| | | | | |
|---|---|---|---|---|
| $r_1 = 103.75$ | $d_1 = 2.4$ | $Nd_1 = 1.8052$ | $\nu d_1 = 25.4$ | |
| $r_2 = 60.68$ | $d_2 = 11.0$ | $Nd_2 = 1.6703$ | $\nu d_2 = 57.6$ | $G_1$ |
| $r_3 = 468.51$ | $d_3 = 0.1$ | | | |
| $r_4 = 43.06$ | $d_4 = 4.3$ | $Nd_3 = 1.717$ | $\nu d_3 = 48.1$ | |
| $r_5 = 57.29$ | $d_5 = $ variable | | | |
| $r_6 = 42.81$ | $d_6 = 1.2$ | $Nd_4 = 1.4978$ | $\nu d_4 = 82.3$ | |
| $r_7 = 19.56$ | $d_7 = 10.0$ | | | $C_1$ |
| $r_8 = 576.60$ | $d_8 = 1.2$ | $Nd_5 = 1.4978$ | $\nu d_5 = 82.3$ | |
| $r_9 = 24.60$ | $d_9 = 7.5$ | | | |
| $r_{10} = -76.36$ | $d_{10} = 3.5$ | $Nd_6 = 1.7234$ | $\nu d_6 = 38.0$ | $C_2$ $G_2$ |
| $r_{11} = -39.20$ | $d_{11} = 1.8$ | | | |
| $r_{12} = -40.87$ | $d_{12} = 1.2$ | $Nd_7 = 1.6223$ | $\nu d_7 = 53.1$ | $C_3$ |
| $r_{13} = -123.32$ | $d_{13} = 0.1$ | | | |
| $r_{14} = 20.55$ | $d_{14} = 2.6$ | $Nd_8 = 1.7283$ | $\nu d_8 = 28.3$ | $C_4$ |
| $r_{15} = 22.48$ | $d_{15} = $ variable | | | |
| $r_{16} = 31.18$ | $d_{16} = 2.1$ | $Nd_9 = 1.6237$ | $\nu d_9 = 47.1$ | |
| $r_{17} = -98.50$ | $d_{17} = 1.0$ | $Nd_{10} = 1.795$ | $\nu d_{10} = 28.6$ | |
| $r_{18} = 91.80$ | $d_{18} = 0.1$ | | | |
| $r_{19} = 20.74$ | $d_{19} = 1.9$ | $Nd_{11} = 1.6204$ | $\nu d_{11} = 60.3$ | |
| $r_{20} = 62.37$ | $d_{20} = 4.5$ | | | |
| $r_{21} = -44.93$ | $d_{21} = 1.1$ | $Nd_{12} = 1.717$ | $\nu d_{12} = 48.1$ | $G_3$ |
| $r_{22} = 24.86$ | $d_{22} = 1.8$ | | | |
| $r_{23} = -1197.33$ | $d_{23} = 3.0$ | $Nd_{13} = 1.4978$ | $\nu d_{13} = 82.3$ | |
| $r_{24} = -21.98$ | $d_{24} = 0.1$ | | | |
| $r_{25} = 39.91$ | $d_{25} = 2.1$ | $Nd_{14} = 1.4978$ | $\nu d_{14} = 82.3$ | |
| $r_{26} = -168.56$ | S' | | | |

$f_A = 107.10$
$f_I = 114.10$
$f_{II} = -32.30$
$f_{III} = -40.85$
S': Back focal length

| Magnification | $d_5$ | $d_{15}$ | S' |
|---|---|---|---|
| 0.04 | 2.515 | 43.313 | 53.782 |
| 0.06 | 14.072 | 25.056 | 60.482 |
| 0.08 | 18.818 | 13.030 | 67.763 |
| 0.105 | 17.139 | 1.868 | 80.604 |

Fifth Embodiment $f = 45.5$ mm~91.0 mm  Effective aperture ratio Fe 1:6.3~1:15.4
Magnification 0.127~0.308

| | | | | |
|---|---|---|---|---|
| $r_1 = 64.21$ | $d_1 = 1.7$ | $Nd_1 = 1.8052$ | $\nu d_1 = 25.4$ | |
| $r_2 = 39.50$ | $d_2 = 6.0$ | $Nd_2 = 1.6703$ | $\nu d_2 = 57.6$ | $G_1$ |
| $r_3 = 171.73$ | $d_3 = 0.1$ | | | |
| $r_4 = 41.31$ | $d_4 = 3.3$ | $Nd_3 = 1.713$ | $\nu d_3 = 54.0$ | |
| $r_5 = 62.29$ | $d_5 = $ variable | | | |
| $r_6 = 31.09$ | $d_6 = 0.9$ | $Nd_4 = 1.5512$ | $\nu d_4 = 49.6$ | |
| $r_7 = 15.22$ | $d_7 = 3.2$ | | | $C_1$ |
| $r_8 = 77.26$ | $d_8 = 0.9$ | $Nd_5 = 1.5512$ | $\nu d_5 = 49.6$ | |
| $r_9 = 27.29$ | $d_9 = 2.9$ | | | |
| $r_{10} = -57.16$ | $d_{10} = 2.1$ | $Nd_6 = 1.7174$ | $\nu d_6 = 29.5$ | $C_2$ $G_2$ |
| $r_{11} = -27.49$ | $d_{11} = 1.5$ | | | |
| $r_{12} = -23.66$ | $d_{12} = 0.9$ | $Nd_7 = 1.6223$ | $\nu d_7 = 53.1$ | $C_3$ |
| $r_{13} = 371.78$ | $d_{13} = 0.1$ | | | |
| $r_{14} = 30.22$ | $d_{14} = 2.1$ | $Nd_8 = 1.7174$ | $\nu d_8 = 29.5$ | $C_4$ |
| $r_{15} = 80.73$ | $d_{15} = $ variable | | | |
| $r_{16} = 38.44$ | $d_{16} = 2.5$ | $Nd_9 = 1.6204$ | $\nu d_9 = 60.3$ | |
| $r_{17} = -35.07$ | $d_{17} = 1.0$ | $Nd_{10} = 1.8052$ | $\nu d_{10} = 25.4$ | |
| $r_{18} = -64.96$ | $d_{18} = 0.1$ | | | |
| $r_{19} = 18.76$ | $d_{19} = 1.9$ | $Nd_{11} = 1.6031$ | $\nu d_{11} = 60.7$ | |
| $r_{20} = 35.56$ | $d_{20} = 4.6$ | | | |
| $r_{21} = -3930.79$ | $d_{21} = 2.1$ | $Nd_{12} = 1.7880$ | $\nu d_{12} = 47.5$ | $G_3$ |
| $r_{22} = 19.04$ | $d_{22} = 2.4$ | | | |
| $r_{23} = -72.39$ | $d_{23} = 1.0$ | $Nd_{13} = 1.6127$ | $\nu d_{13} = 44.4$ | |
| $r_{24} = 39.08$ | $d_{24} = 3.8$ | $Nd_{14} = 1.5182$ | $\nu d_{14} = 59.0$ | |
| $r_{25} = -26.93$ | $d_{25} = 0.1$ | | | |
| $r_{26} = 32.53$ | $d_{26} = 2.3$ | $Nd_{15} = 1.5186$ | $\nu d_{15} = 70.1$ | |
| $r_{27} = 298.36$ | S' | | | |

$f_A = 71.70$
$f_I = 87.184$
$f_{II} = -32.482$
$f_{III} = 40.069$
S': Back focal length

| Magnification | $d_5$ | $d_{15}$ | S' |
|---|---|---|---|
| 0.127 | 1.117 | 28.201 | 57.760 |
| 0.173 | 10.236 | 19.082 | 63.789 |

-continued

| Fifth Embodiment | | | |
|---|---|---|---|
| 0.241 | 18.855 | 10.464 | 71.272 |
| 0.308 | 24.667 | 4.652 | 77.622 |

Figure 6A:
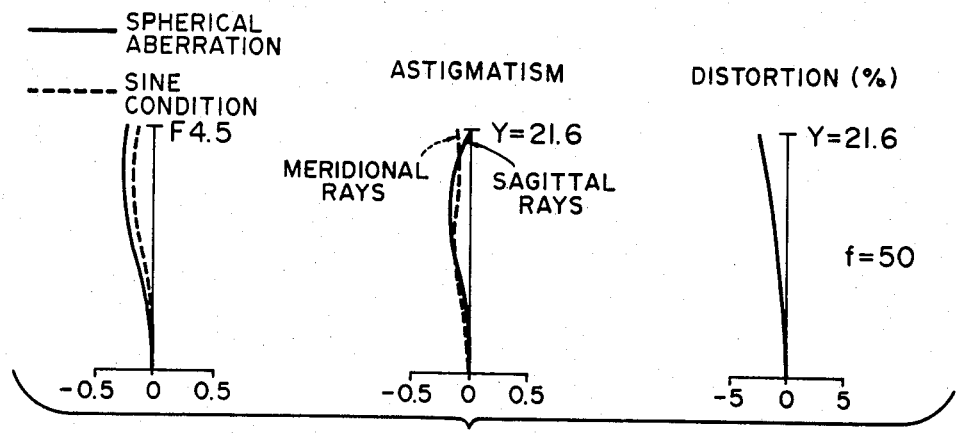
FIGS. 6A–6C to 10A–10D illustrate the various aberrations in the first to fifth embodiments, respectively.
Figure 6B:
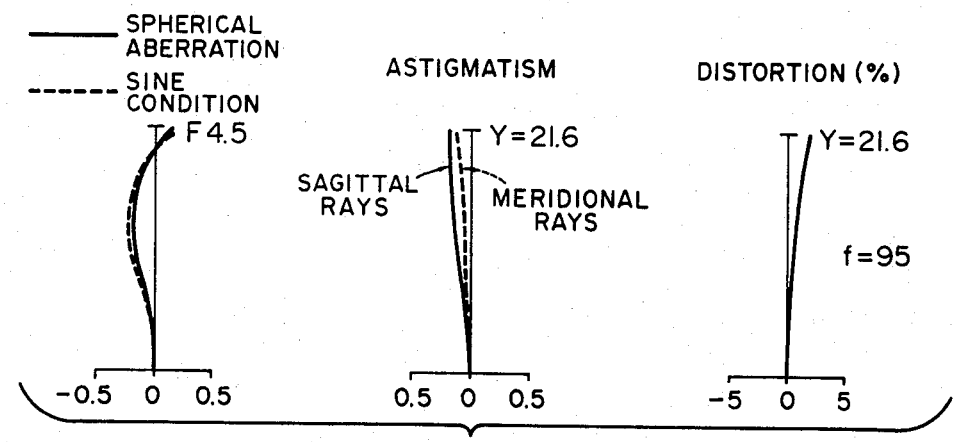
Figure 6C:
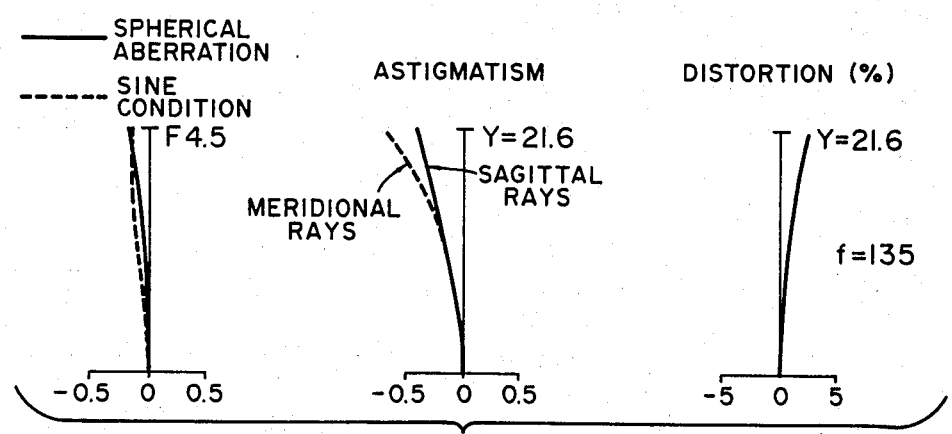
Figure 7A:
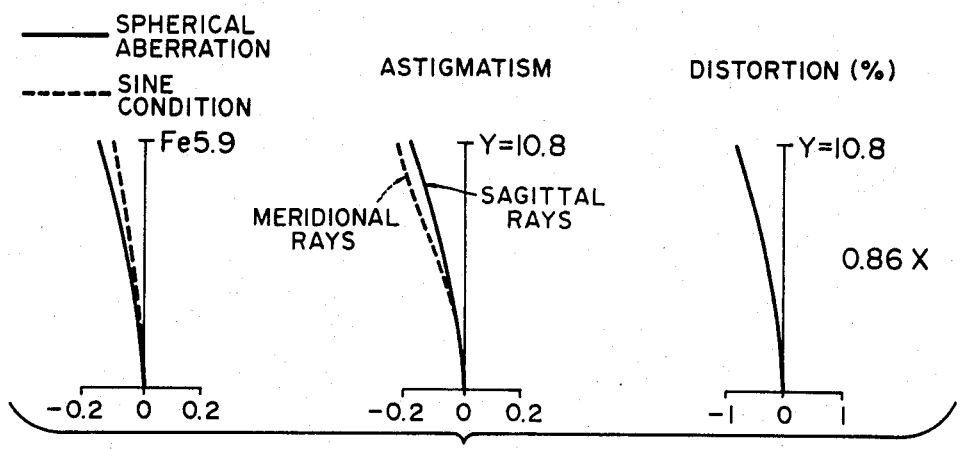
Figure 7B:
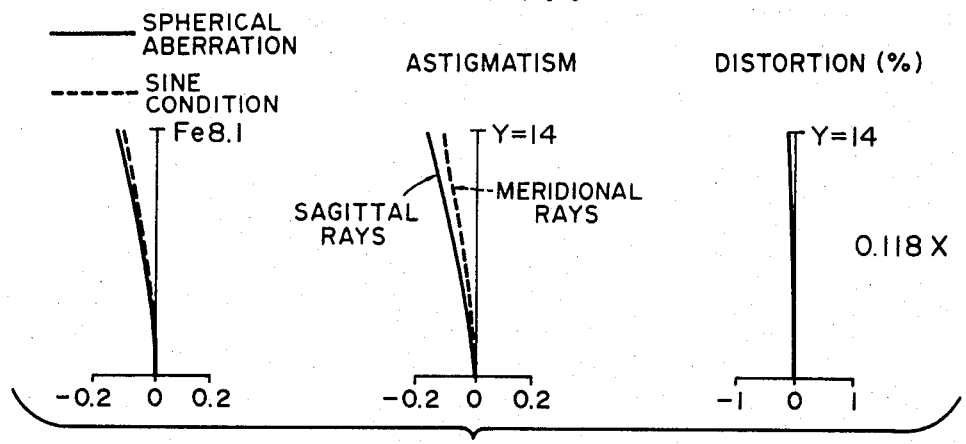
Figure 7C:
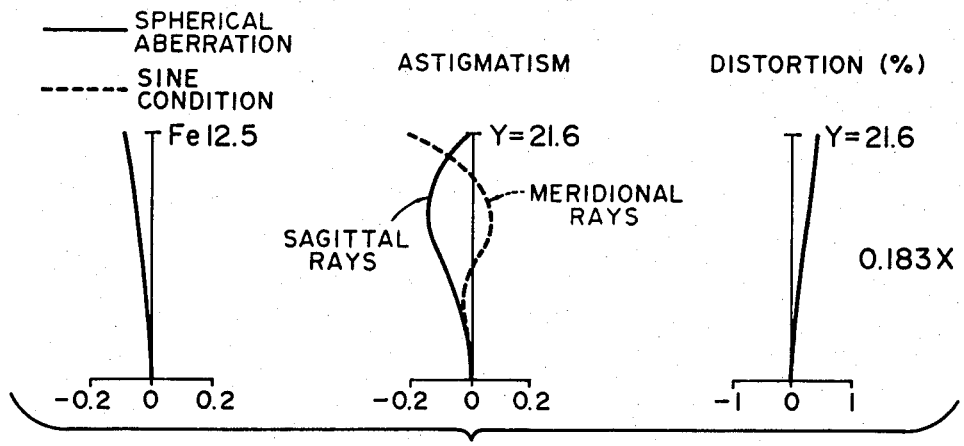
Figure 7D:
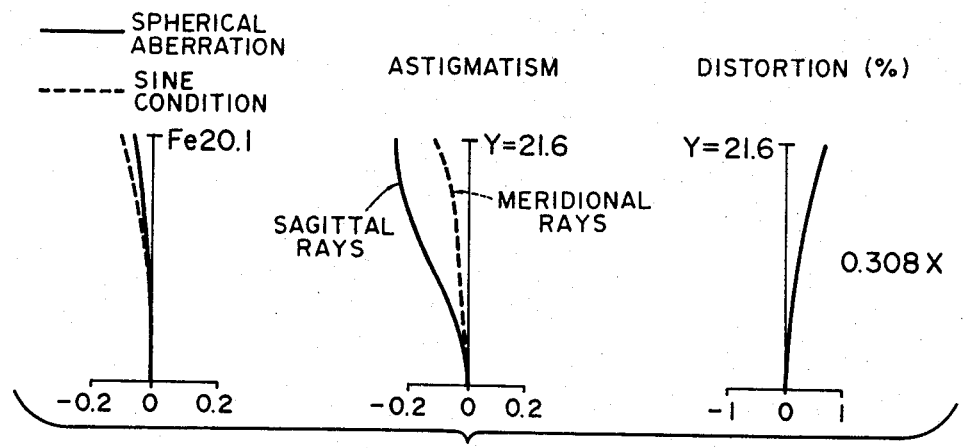
Figure 8A:
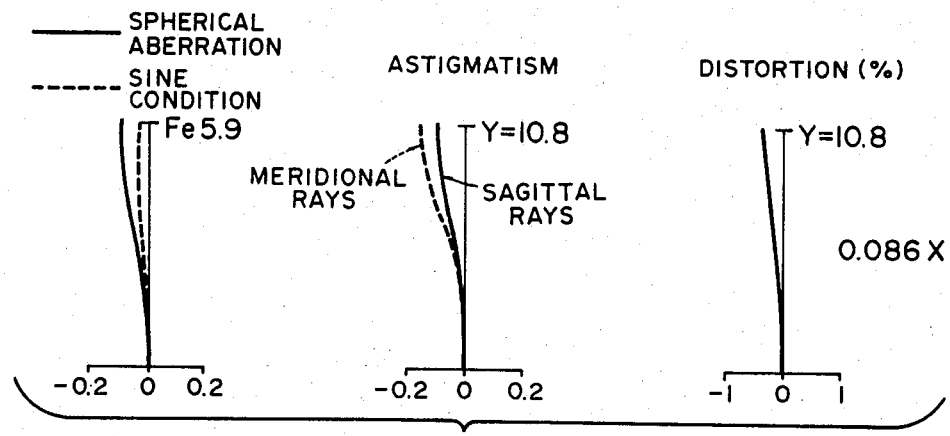
Figure 8B:
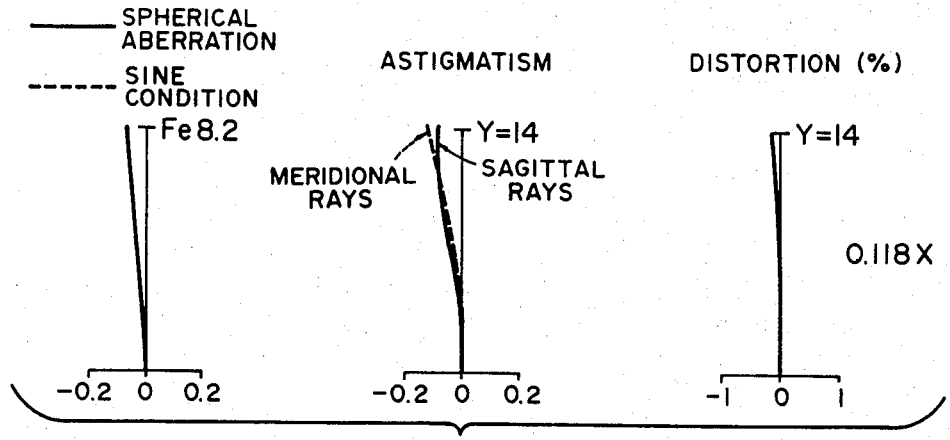
Figure 8C:
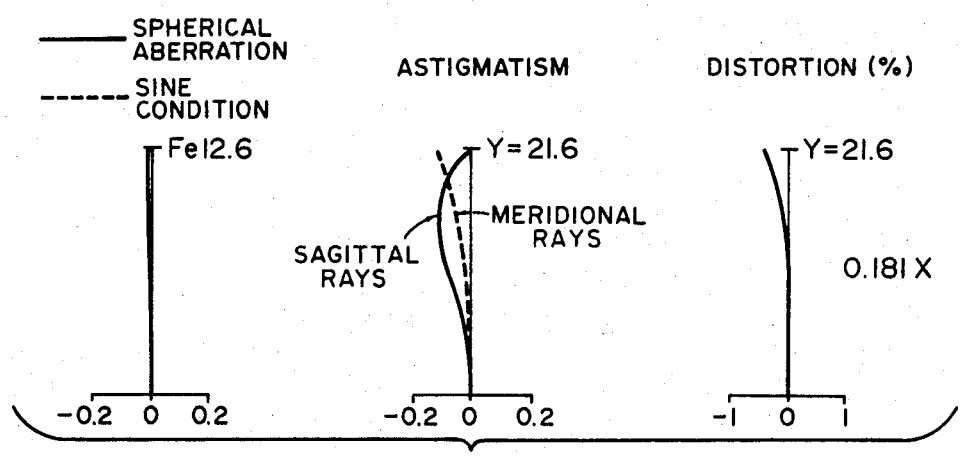
Figure 8D:
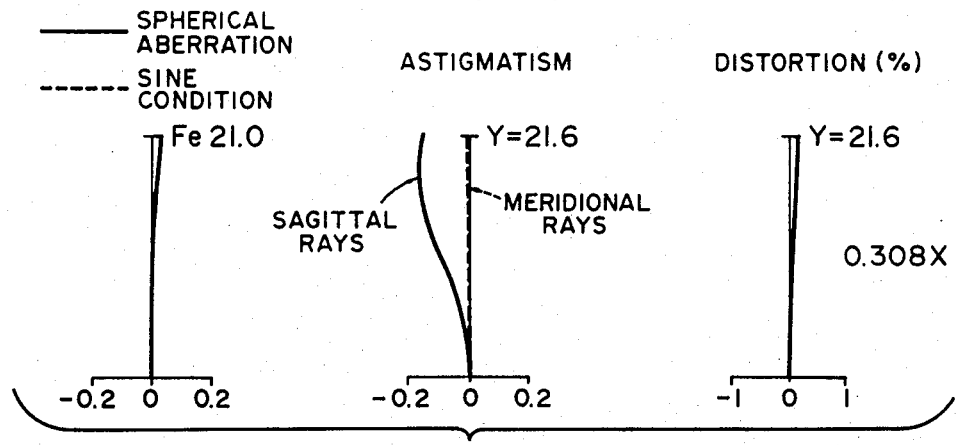
Figure 9A:
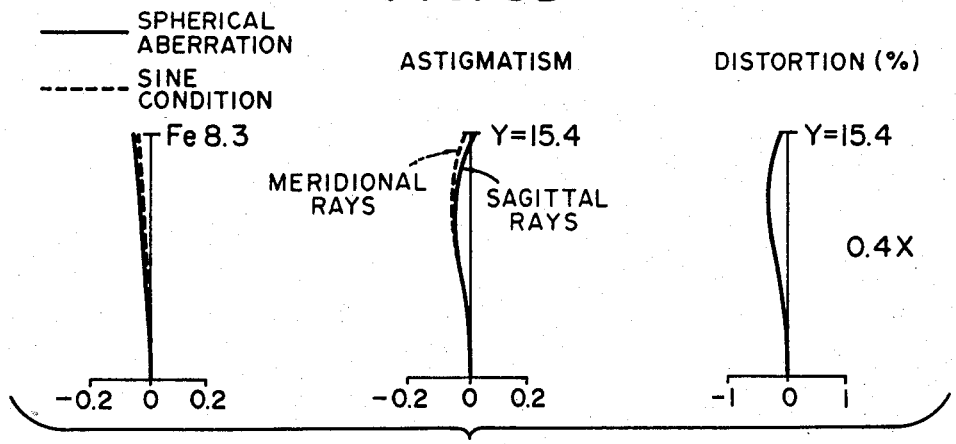
Figure 9B:
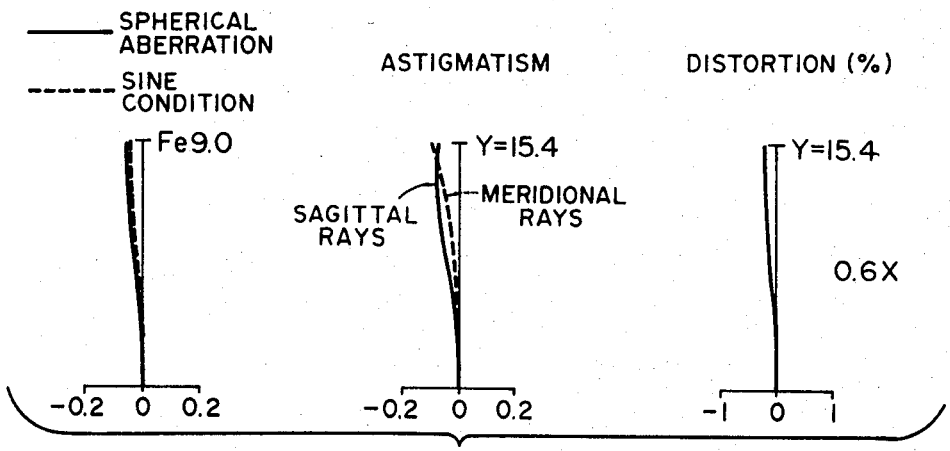
Figure 9C:
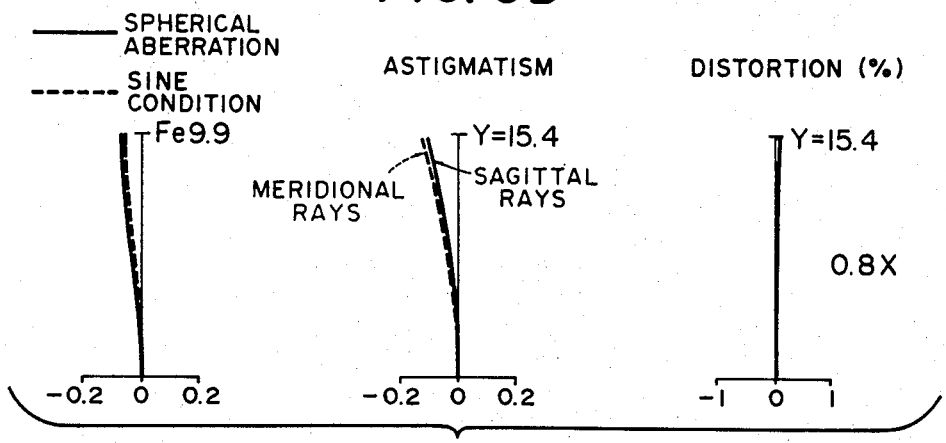
Figure 9D:
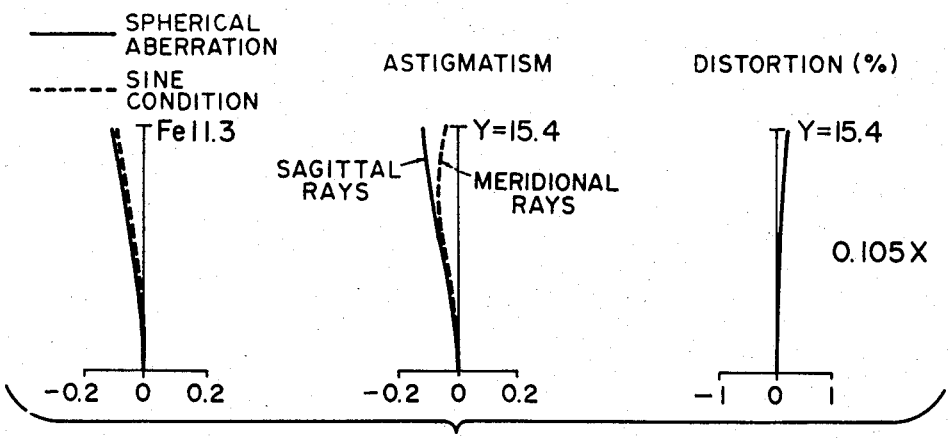
Figure 10A:
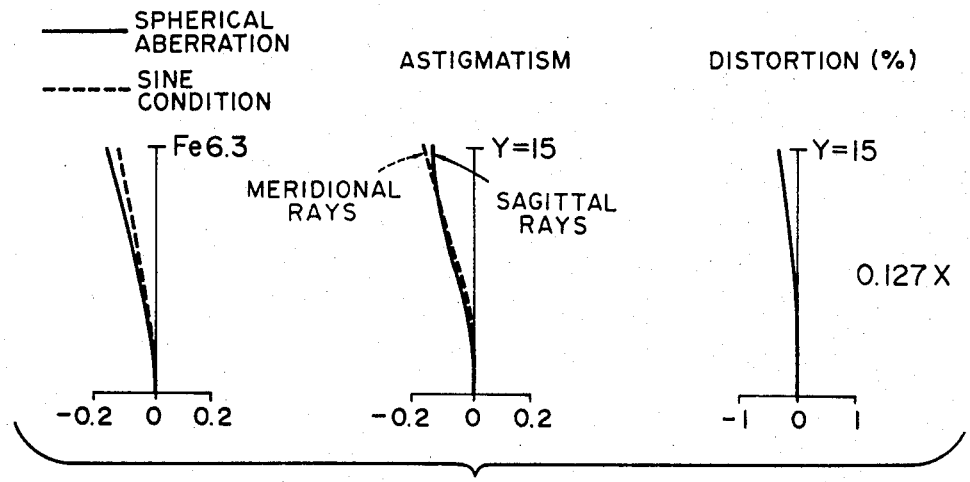
Figure 10B:
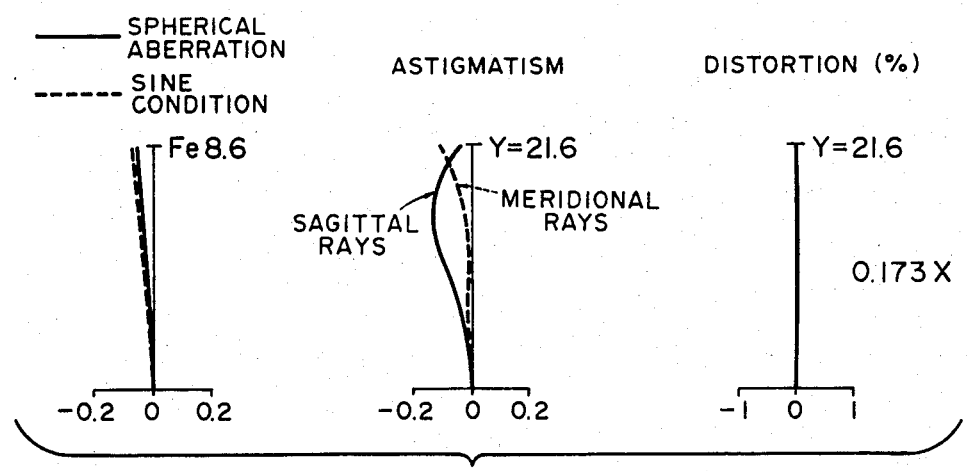
Figure 10C:
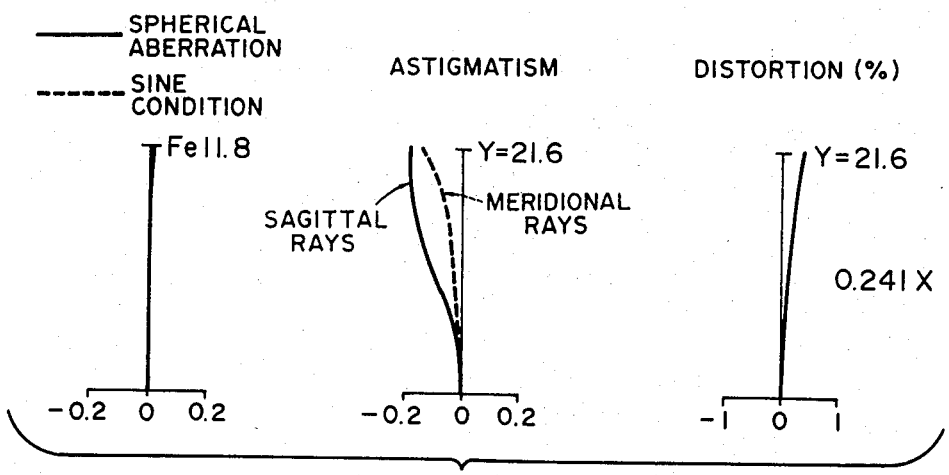
Figure 10D:
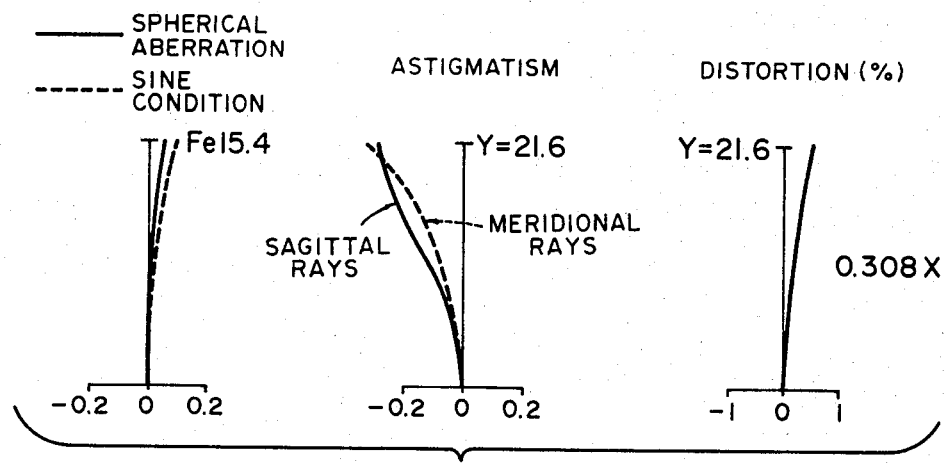

The various aberrations in the above-described embodiments are illustrated in FIGS. 6A–6C to 10A–10D. In FIGS. 6A–6C which illustrates the aberrations in the first embodiment, the various aberrations in the three conditions, i.e., shortest (6A), medium (6B) and longest conditions (6C), of the focal length varied by magnification change are shown. In FIGS. 7A–7D to 10A–10D which illustrate the aberrations in the second to fifth embodiments, the various aberrations in the four conditions (A–D), i.e., minimum, medium and maximum conditions, of the photographing magnification varied by magnification change are shown. As seen from each aberration graph, the various aberrations are sufficiently well corrected in the first embodiment as a zoom lens for ordinary photography, and the second to fifth embodiments also have a sufficient imaging performance as a zoom lens for finite distance, and particularly distortion is very well corrected therein.

We claim:

1. A three-group zoom lens having, in succession from a remoter imaging conjugate plane side, a convergent first group, a divergent second group and a convergent third group and in which by moving said second group and said third group in different manners of movement, the focal length of the entire system can be varied while maintaining the image plane constant, characterized in that said second group has, in succession from said first group side, a first component including at least one negative meniscus lens having its convex surface facing said first group, a second component which is a positive meniscus lens having its concave surface facing said first group, a third component which is a negative lens, and a fourth component which is a positive lens, and further characterized in that said zoom lens satisfies the following conditions:

$$|1.5f_{II}| < f_A < |4.0f_{II}| \tag{1}$$

$$-5.0 < \frac{R_{A2} + R_{A1}}{R_{A2} - R_{A1}} < -1.5 \tag{2}$$

where $f_A$ represents the focal length of the positive meniscus lens which is the second component, $R_{A1}$ represents the radius of curvature of the surface of said second component which is adjacent to said first group, $R_{A2}$ represents the radius of curvature of the surface of said second component which is adjacent to said third group, and $f_{II}$ represents the combined focal length of said second group.

2. A zoom lens according to claim 1, further characterized in that it satisfies the following conditions:

$$0.85 < \frac{R_{A2}}{R_{B1}} < 1.25 \tag{3}$$

$$0.02 < \frac{D}{R_{A2}} < 0.15 \tag{4}$$

$$|0.5f_{II}| < |R_{C1}| < |1.3f_{II}| \tag{5}$$

where $R_{B1}$ represents the radius of curvature of the first group side surface of the negative lens which is the third component in said second group, D represents the air space between the second component and the third component in said second group, and $R_{C1}$ represents the radius of curvature of the first group side surface of the positive lens which is the fourth component in said second group.

3. A zoom lens according to claim 2, further characterized in that said first group has two positive lens components, one of which has a negative lens and a positive lens cemented together or separated from each other.

4. A zoom lens according to claim 3, further characterized in that it satisfies the following condition:

$$0.3f_I < R_{D1} < 0.8f_I$$

where $R_{D1}$ represents the radius of curvature of the first surface of the positive lens of said first group which is most adjacent to said second group, and $f_I$ represents the combined focal length of said first group.

5. A zoom lens according to claim 2, further characterized in that said third group has, in succession from the second group side, a positive first component, a negative second component and a positive third component, said positive first component includes at least two positive lenses, said negative second component includes a single or cemented negative lens, and said positive third component includes at least one positive lens.

6. A zoom lens according to claim 3, further characterized in that numerical data are as follows:

| First Embodiment | | | | |
|---|---|---|---|---|
| f = 50 mm ~ 135 mm Aperture ratio 1:4.5 | | | | |
| $r_1 = 533.59$ | $d_1 = 1.5$ | $Nd_1 = 1.8052$ | $vd_1 = 25.4$ | |
| $r_2 = 84.07$ | $d_2 = 6.0$ | $Nd_2 = 1.6700$ | $vd_2 = 47.1$ | G1 |
| $r_3 = -377.89$ | $d_3 = 0.1$ | | | |
| $r_4 = 64.57$ | $d_4 = 5.0$ | $Nd_3 = 1.1$ | $vd_3 = 48.1$ | |
| $r_5 = 196.59$ | $d_5 =$ variable | | | |
| $r_6 = 119.01$ | $d_6 = 1.1$ | $Nd_4 = 1.744$ | $vd_4 = 45.1$ C1 | |
| $r_7 = 26.94$ | $d_7 = 7.15$ | | | |
| $r_8 = -108.42$ | $d_8 = 3.1$ | $Nd_5 = 1.7234$ | $vd_5 = 38.0$ C2 | G2 |
| $r_9 = -35.11$ | $d_9 = 1.5$ | | | |
| $r_{10} = -29.88$ | $d_{10} = 1.15$ | $Nd_6 = 1.713$ | $vd_6 = 54.0$ C3 | |
| $r_{11} = 50.31$ | $d_{11} = 1.35$ | | | |
| $r_{12} = 42.32$ | $d_{12} = 3.0$ | $Nd_7 = 1.795$ | $vd_7 = 28.6$ C4 | |
| $r_{13} = 498.92$ | $d_{13} =$ variable | | | |
| $r_{14} = 59.35$ | $d_{14} = 2.3$ | $Nd_8 = 1.5891$ | $vd_8 = 61.2$ | |
| $r_{15} = -2202.0$ | $d_{15} = 0.2$ | | | |

-continued

First Embodiment

| | | | |
|---|---|---|---|
| $r_{16} = 29.18$ | $d_{16} = 3.45$ | $Nd_9 = 1.5112$ | $\nu d_9 = 50.9$ |
| $r_{17} = 24.17$ | $d_{17} = 0.2$ | | |
| $r_{18} = 24.17$ | $d_{18} = 3.8$ | $Nd_{10} = 1.5168$ | $\nu d_{10} = 64.1$ |
| $r_{19} = 39.33$ | $d_{19} = 5.4$ | | |
| $r_{20} = 173.54$ | $d_{20} = 1.85$ | $Nd_{11} = 1.8052$ | $\nu d_{11} = 25.4$ |
| $r_{21} = 19.91$ | $d_{21} = 6.0$ | | |
| $r_{22} = 44.01$ | $d_{22} = 4.1$ | $Nd_{12} = 1.6127$ | $\nu d_{12} = 44.4$ |
| $r_{23} = -62.20$ | $S'$ | | |

$G_3$ bracket spans $Nd_9$–$Nd_{12}$ rows.

$f_A = 70.52$
$f_I = 108.0$
$f_{II} = -35.5$
$f_{III} = 48.5$
$S'$: Back focal length

| Focal length | $d_5$ | $d_{13}$ | $S'$ |
|---|---|---|---|
| 50.0 | 2.495 | 35.69 | 66.409 |
| 95.46 | 24.064 | 13.347 | 76.818 |
| 135.0 | 33.615 | 0.535 | 81.427 | where $r_1$, $r_2$, $r_3$, ..., represent the radii of curvature of the refracting surfaces of the successive lenses from the object side, $d_1$, $d_2$, $d_3$, ..., represent the center thicknesses and air spaces of the respective lenses, $Nd_1$, $Nd_2$, $Nd_3$, ..., represent the refractive indices of the respective lenses for d-line ($\lambda = 587.6$ nm), and $\nu d_1$, $\nu d_2$, $\nu d_3$, ..., represent the Abbe numbers of the respective lenses.

7. A zoom lens according to claim 2, further characterized in that numerical data are as follows:

where $r_1$, $r_2$, $r_3$, ..., represent the radii of curvature of the refracting surfaces of the successive lenses from the object side, $d_1$, $d_2$, $d_3$, ..., represent the center thicknesses and air spaces of the respective lenses, $Nd_1$, $Nd_2$, $Nd_3$, ..., represent the refractive indices of the respective lenses for d-line ($\lambda = 587.6$ nm), and $\nu d_1$, $\nu d_2$, $\nu d_3$, ..., represent the Abbe numbers of the respective lenses.

8. A zoom lens according to claim 2, further characterized in that numerical data are as follows:

Second Embodiment $f = 32$ mm~92 mm Effective aperture ratio Fe 1:5.9~1:20.1
Magnification 0.086~0.308

| | | | | |
|---|---|---|---|---|
| $r_1 = 98.265$ | $d_1 = 2.0$ | $Nd_1 = 1.80518$ | $\nu d_4 = 25.4$ | |
| $r_2 = 56.371$ | $d_2 = 7.0$ | $Nd_2 = 1.67025$ | $\nu d_2 = 57.6$ | $G_1$ |
| $r_3 = 294.111$ | $d_3 = 0.1$ | | | |
| $r_4 = 50.950$ | $d_4 = 4.3$ | $Nd_3 = 1.713$ | $\nu d_3 = 54.0$ | |
| $r_5 = 86.420$ | $d_5 =$ variable | | | |
| $r_6 = 51.013$ | $d_6 = 1.0$ | $Nd_4 = 1.744$ | $\nu d_4 = 45.1$ $C_1$ | |
| $r_7 = 16.136$ | $d_7 = 4.6$ | | | |
| $r_8 = -64.087$ | $d_8 = 2.75$ | $Nd_5 = 1.71736$ | $\nu d_5 = 29.5$ $C_2$ | |
| $r_9 = -32.942$ | $d_9 = 1.4$ | | | $G_2$ |
| $r_{10} = -31.525$ | $d_{10} = 1.0$ | $Nd_6 = 1.6223$ | $\nu d_6 = 53.1$ $C_3$ | |
| $r_{11} = 56.459$ | $d_{11} = 1.2$ | | | |
| $r_{12} = 28.476$ | $d_{12} = 3.2$ | $Nd_7 = 1.71736$ | $\nu d_7 = 29.5$ $C_4$ | |
| $r_{13} = 109.727$ | $d_{13} =$ variable | | | |
| $r_{14} = 34.938$ | $d_{14} = 2.6$ | $Nd_8 = 1.62041$ | $\nu d_8 = 60.3$ | |
| $r_{15} = -38.235$ | $d_{15} = 0.9$ | $Nd_9 = 1.80518$ | $\nu d_9 = 25.4$ | |
| $r_{16} = -97.810$ | $d_{16} = 0.1$ | | | |
| $r_{17} = 17.003$ | $d_{17} = 3.0$ | $Nd_{10} = 1.56384$ | $\nu d_{10} = 60.8$ | |
| $r_{18} = 37.067$ | $d_{18} = 4.0$ | | | |
| $r_{19} = 294.676$ | $d_{19} = 3.8$ | $Nd_{11} = 1.78797$ | $\nu d_{11} = 47.5$ | $G_3$ |
| $r_{20} = 15.549$ | $d_{20} = 3.3$ | | | |
| $r_{21} = 348.245$ | $d_{21} = 1.8$ | $Nd_{12} = 1.49782$ | $\nu d_{12} = 82.3$ | |
| $r_{22} = -34.381$ | $d_{22} = 0.1$ | | | |
| $r_{23} = 23.524$ | $d_{23} = 2.7$ | $Nd_{13} = 1.49782$ | $\nu d_{13} = 82.3$ | |
| $r_{24} = 62.146$ | $S'$ | | | |

$f_A = 91.130$
$f_I = 105.00$
$f_{II} = -31.932$
$f_{III} = 36.385$
$S' =$ Back focal length

| Magnification | $d_5$ | $d_{13}$ | $S'$ |
|---|---|---|---|
| 0.086 | 1.716 | 36.947 | 43.015 |
| 0.118 | 12.516 | 26.147 | 48.542 |
| 0.183 | 24.516 | 14.147 | 58.399 |
| 0.308 | 35.516 | 3.147 | 75.707 |

Third Embodiment $f = 32$ mm~94 mm Effective aperture ratio Fe 1:5.9~1:21
Magnification 0.086~0.308

| | | | | |
|---|---|---|---|---|
| $r_1 = 131.806$ | $d_1 = 2.0$ | $Nd_1 = 1.71736$ | $\nu d_1 = 29.5$ | |
| $r_2 = 56.247$ | $d_2 = 11.0$ | $Nd_2 = 1.67025$ | $\nu d_2 = 57.6$ | $G_1$ |
| $r_3 = 208.885$ | $d_3 = 1.0$ | | | |
| $r_4 = -149.871$ | $d_4 = 2.0$ | $Nd_3 = 1.54814$ | $\nu d_3 = 45.9$ | |

-continued

Third Embodiment

| | | | |
|---|---|---|---|
| $r_5 = 434.555$ | $d_5 = 0.1$ | | |
| $r_6 = 48.661$ | $d_6 = 4.0$ | $Nd_4 = 1.717$ | $\nu d_4 = 48.1$ |
| $r_7 = 82.614$ | $d_7 =$ variable | | |
| $r_8 = 27.655$ | $d_8 = 0.9$ | $Nd_5 = 1.55115$ | $\nu d_5 = 49.6$ |
| $r_9 = 14.510$ | $d_9 = 3.7$ | | |
| $r_{10} = 62.590$ | $d_{10} = 0.9$ | $Nd_6 = 1.55115$ | $\nu d_6 = 49.6$ } $C_1$ |
| $r_{11} = 22.908$ | $d_{11} = 3.2$ | | |
| $r_{12} = -51.007$ | $d_{12} = 2.0$ | $Nd_7 = 1.71736$ | $\nu d_7 = 29.5$  $C_2$  } $G_2$ |
| $r_{13} = -26.403$ | $d_{13} = 1.4$ | | |
| $r_{14} = -24.720$ | $d_{14} = 0.9$ | $Nd_8 = 1.6223$ | $\nu d_8 = 53.1$  $C_3$ |
| $r_{15} = 296.098$ | $d_{15} = 0.1$ | | |
| $r_{16} = 26.790$ | $d_{16} = 2.0$ | $Nd_9 = 1.71736$ | $\nu d_9 = 29.5$  $C_4$ |
| $r_{17} = 61.177$ | $d_{17} =$ variable | | |
| $r_{18} = 40.653$ | $d_{18} = 3.0$ | $Nd_{10} = 1.62041$ | $\nu d_{10} = 60.4$ |
| $r_{19} = -34.546$ | $d_{19} = 0.9$ | $Nd_{11} = 1.80518$ | $\nu d_{11} = 25.4$ |
| $r_{20} = -64.772$ | $d_{20} = 0.1$ | | |
| $r_{21} = 17.153$ | $d_{21} = 1.7$ | $Nd_{12} = 1.60311$ | $\nu d_{12} = 60.7$ |
| $r_{22} = 38.274$ | $d_{22} = 4.2$ | | |
| $r_{23} = -172.190$ | $d_{23} = 1.9$ | $Nd_{13} = 1.78797$ | $\nu d_{13} = 47.5$  } $G_3$ |
| $r_{24} = 18.932$ | $d_{24} = 2.2$ | | |
| $r_{25} = -68.879$ | $d_{25} = 0.9$ | $Nd_{14} = 1.61266$ | $\nu d_{14} = 44.5$ |
| $r_{26} = 30.859$ | $d_{26} = 3.1$ | $Nd_{15} = 1.51823$ | $\nu d_{15} = 59.0$ |
| $r_{27} = -21.455$ | $d_{27} = 0.1$ | | |
| $r_{28} = 30.206$ | $d_{28} = 2.1$ | $Nd_{16} = 1.51860$ | $\nu d_{16} = 70.1$ |
| $r_{29} = 180.423$ | $S'$ | | |

$f_A = 73.80$
$f_I = 109.85$
$f_{II} = -31.25$
$f_{III} = 36.48$
$S'$: Back focal length

| Magnification | $d_7$ | $d_{17}$ | $S'$ |
|---|---|---|---|
| 0.086 | 1.548 | 37.525 | 47.654 |
| 0.118 | 12.233 | 26.840 | 53.259 |
| 0.181 | 24.216 | 14.856 | 63.520 |
| 0.308 | 35.201 | 3.872 | 82.256 | where $r_1, r_2, r_3, \ldots$, represent the radii of curvature of the refracting surfaces of the successive lenses from the object side, $d_1, d_2, d_3, \ldots$, represent the center thicknesses and air spaces of the respective lenses, $Nd_1, Nd_2, Nd_3, \ldots$, represent the refractive indices of the respective lenses for d-line ($\lambda = 587.6$ nm), and $\nu d_1, \nu d_2, \nu d_3, \ldots$, represent the Abbe numbers of the respective lenses.

9. A zoom lens according to claim 2, further characterized in that numerical data are as follows:

Fourth Embodiment $f = 32$ mm~80 mm  Effective aperture ratio Fe 1:8.3~1:11.3
Magnification 0.04~0.105

| | | | |
|---|---|---|---|
| $r_1 = 103.75$ | $d_1 = 2.4$ | $Nd_1 = 1.8052$ | $\nu d_1 = 25.4$ |
| $r_2 = 60.68$ | $d_2 = 11.0$ | $Nd_2 = 1.6703$ | $\nu d_2 = 57.6$  } $G_1$ |
| $r_3 = 468.51$ | $d_3 = 0.1$ | | |
| $r_4 = 43.06$ | $d_4 = 0.4$ | $Nd_3 = 1.717$ | $\nu d_4 = 48.1$ |
| $r_5 = 57.29$ | $d_5 =$ variable | | |
| $r_6 = 42.81$ | $d_6 = 1.2$ | $Nd_4 = 1.4978$ | $\nu d_4 = 82.3$ |
| $r_7 = 19.56$ | $d_7 = 10.0$ | | |
| $r_8 = 576.60$ | $d_8 = 1.2$ | $Nd_5 = 1.4978$ | $\nu d_5 = 82.3$  } $C_1$ |
| $r_9 = 24.60$ | $d_9 = 7.5$ | | |
| $r_{10} = -76.36$ | $d_{10} = 3.5$ | $Nd_6 = 1.7234$ | $\nu d_4 = 38.0$  $C_2$  } $G_2$ |
| $r_{11} = -39.20$ | $d_{11} = 1.8$ | | |
| $r_{12} = -40.87$ | $d_{12} = 1.2$ | $Nd_7 = 1.6223$ | $\nu d_7 = 53.1$  $C_3$ |
| $r_{13} = -123.32$ | $d_{13} = 0.1$ | | |
| $r_{14} = 20.55$ | $d_{14} = 2.6$ | $Nd_8 = 1.7283$ | $\nu d_8 = 28.3$  $C_4$ |
| $r_{15} = 22.48$ | $d_{15} =$ variable | | |
| $r_{16} = 31.18$ | $d_{16} = 2.1$ | $Nd_9 = 1.6237$ | $\nu d_9 = 47.1$ |
| $r_{17} = -98.50$ | $d_{17} = 1.0$ | $Nd_{10} = 1.795$ | $\nu d_{10} = 28.6$ |
| $r_{18} = 91.80$ | $d_{18} = 0.1$ | | |
| $r_{19} = 20.74$ | $d_{19} = 1.9$ | $Nd_{11} = 1.6204$ | $\nu d_{11} = 60.3$ |
| $r_{20} = 62.37$ | $d_{20} = 4.5$ | | |
| $r_{21} = -44.93$ | $d_{21} = 1.1$ | $Nd_{12} = 1.717$ | $\nu d_{12} = 48.1$  } $G_3$ |
| $r_{22} = 24.86$ | $d_{22} = 1.8$ | | |
| $r_{23} = -1197.33$ | $d_{23} = 3.0$ | $Nd_{13} = 1.4978$ | $\nu_{13} = 82.3$ |
| $r_{24} = -21.98$ | $d_{24} = 0.1$ | | |
| $r_{25} = 39.91$ | $d_{25} = 2.1$ | $Nd_{14} = 1.4978$ | $\nu d_{14} = 82.3$ |
| $r_{26} = -168.56$ | $S'$ | | |

$f_A = 107.10$
$f_I = 114.10$
$f_{II} = -32.30$
$f_{III} = -40.85$
$S'$: Back focal length

| Magnification | $d_5$ | $d_{15}$ | $S'$ |
|---|---|---|---|
| 0.04 | 2.515 | 43.313 | 53.782 |

-continued

| Fourth Embodiment | | | |
|---|---|---|---|
| 0.06 | 14.072 | 25.056 | 60.482 |
| 0.08 | 18.818 | 13.030 | 67.763 |
| 0.105 | 17.139 | 1.868 | 80.604 | where $r_1, r_2, r_3, \ldots$, represent the radii of curvature of the refracting surfaces of the successive lenses from the object side, $d_1, d_2, d_3, \ldots$, represent the center thicknesses and air spaces of the respective lenses, $Nd_1, Nd_2, Nd_3, \ldots$, represent the refractive indices of the respective lenses for d-line ($\lambda=587.6$ nm) and $\nu d_1, \nu d_2, \nu d_3, \ldots$, represent the Abbe numbers of the respective lenses.

10. A zoom lens according to claim 2, further characterized in that numerical data are as follows:

Fifth Embodiment $f = 45.5$ mm~91.0 mm Effective aperture ratio Fe 1:6.3~1:15.4
Magnification 0.127~0.308

| | | | |
|---|---|---|---|
| $r_1 = 64.21$ | $d_1 = 1.7$ | $Nd_1 = 1.8052$ | $\nu d_1 = 25.4$ |
| $r_2 = 39.50$ | $d_2 = 6.0$ | $Nd_2 = 1.6703$ | $\nu d_2 = 57.6$ |
| $r_3 = 171.73$ | $d_3 = 0.1$ | | |
| $r_4 = 41.31$ | $d_4 = 3.3$ | $Nd_3 = 1.713$ | $\nu d_3 = 54.0$ |
| $r_5 = 62.29$ | $d_5 = $ variable | | |
| $r_6 = 31.09$ | $d_6 = 0.9$ | $Nd_4 = 1.5512$ | $\nu d_4 = 49.6$ |
| $r_7 = 15.22$ | $d_7 = 3.2$ | | |
| $r_8 = 77.26$ | $d_8 = 0.9$ | $Nd_5 = 1.5512$ | $\nu d_5 = 49.6$ |
| $r_9 = 27.29$ | $d_9 = 2.9$ | | |
| $r_{10} = -57.16$ | $d_{10} = 2.1$ | $Nd_6 = 1.7174$ | $\nu d_6 = 29.5$ |
| $r_{11} = -27.49$ | $d_{11} = 1.5$ | | |
| $r_{12} = -23.66$ | $d_{12} = 0.9$ | $Nd_7 = 1.6223$ | $\nu d_7 = 53.1$ |
| $r_{13} = 371.78$ | $d_{13} = 0.1$ | | |
| $r_{14} = 30.22$ | $d_{14} = 2.1$ | $Nd_8 = 1.7174$ | $\nu d_4 = 29.5$ |
| $r_{15} = 80.73$ | $d_{15} = $ variable | | |
| $r_{16} = 38.44$ | $d_{16} = 2.5$ | $Nd_9 = 1.6204$ | $\nu d_9 = 60.3$ |
| $r_{17} = -35.07$ | $d_{17} = 1.0$ | $Nd_{10} = 1.8052$ | $\nu d_{10} = 25.4$ |
| $r_{18} = -64.96$ | $d_{18} = 0.1$ | | |
| $r_{19} = 18.76$ | $d_{19} = 1.9$ | $Nd_{11} = 1.6031$ | $\nu d_{11} = 60.7$ |
| $r_{20} = 35.56$ | $d_{20} = 4.6$ | | |
| $r_{21} = -3930.79$ | $d_{21} = 2.1$ | $Nd_{12} = 1.7880$ | $\nu d_{12} = 47.5$ |
| $r_{22} = 19.04$ | $d_{22} = 2.4$ | | |
| $r_{23} = -72.39$ | $d_{23} = 1.0$ | $Nd_{13} = 1.6127$ | $\nu d_{13} = 44.4$ |
| $r_{24} = 39.08$ | $d_{24} = 3.8$ | $Nd_{14} = 1.5182$ | $\nu d_{14} = 59.0$ |
| $r_{25} = -26.93$ | $d_{25} = 0.1$ | | |
| $r_{26} = 32.53$ | $d_{26} = 2.3$ | $Nd_{15} = 1.5186$ | $\nu d_{15} = 70.1$ |
| $r_{27} = 298.36$ | S' | | |

$f_A = 71.70$
$f_I = 87.184$
$f_{II} = -32.482$
$f_{III} = 40.069$
S': Back focal length

| Magnification | $d_5$ | $d_{15}$ | S' |
|---|---|---|---|
| 0.127 | 1.117 | 28.201 | 57.760 |
| 0.173 | 10.236 | 19.082 | 63.789 |
| 0.241 | 18.855 | 10.464 | 71.272 |
| 0.308 | 24.667 | 4.652 | 77.622 | where $r_1, r_2, r_3, \ldots$, represent the radii of curvature of the refracting surfaces of the successive lenses from the object side, $d_1, d_2, d_3, \ldots$, represent the center thicknesses and air spaces of the respective lenses, $Nd_1, Nd_2, Nd_3, \ldots$, represent the refractive indices of the respective lenses for d-line ($\lambda=587.6$ nm), and $\nu d_1, \nu d_2, \nu d_3, \ldots$, represent the Abbe numbers of the respective lenses.

* * * * *